United States Patent [19]

Sugasawa

[11] Patent Number: 4,947,328

[45] Date of Patent: Aug. 7, 1990

[54] VEHICLE STEERING ANGLE CONTROL SYSTEM

[75] Inventor: Fukashi Sugasawa, Yokohama, Japan

[73] Assignee: Nissan Motor Co., Ltd., Japan

[21] Appl. No.: 195,085

[22] Filed: May 17, 1988

[30] Foreign Application Priority Data

May 19, 1987 [JP] Japan .............................. 62-120261

[51] Int. Cl.$^5$ ............................................... B62D 5/00
[52] U.S. Cl. ............................... 364/424.05; 180/142; 280/91
[58] Field of Search ...................... 364/424.01, 424.05; 180/141, 142, 79.1; 74/388 PS; 318/580, 586

[56] References Cited

U.S. PATENT DOCUMENTS

| | | | |
|---|---|---|---|
| 4,593,358 | 6/1986 | Takeshima et al. | 180/141 |
| 4,666,013 | 5/1987 | Shibahata et al. | 180/141 |
| 4,705,130 | 11/1987 | Fukunago et al. | 180/140 |
| 4,705,131 | 11/1987 | ShibG36ahata et al. | 180/190 |
| 4,706,771 | 11/1987 | Kawabe et al. | 180/142 |
| 4,768,603 | 9/1988 | Sugiyama et al. | 180/140 |
| 4,773,012 | 9/1988 | Ito et al. | 364/424.01 |
| 4,794,536 | 12/1988 | Eto et al. | 364/424.05 |

*Primary Examiner*—Thomas G. Black
*Attorney, Agent, or Firm*—Leydig, Voit & Mayer

[57] ABSTRACT

In order to imprive the accuracy of the time derivative of a steering angle signal consisting of discrete measured values, a vehicle steering control system for producing a steering angle control signal from the steering angle, the time derivative of the steering angle and other data is provided with a controller having a averaging section for periodically determining an average of a predetermined number of the measured values of the steering angle, and a differentiating section for determining the time derivative of the steering angle by using the averages determined by the averaging section, instead of directly using the steering angle signal.

7 Claims, 4 Drawing Sheets

VEHICLE STEERING ANGLE CONTROL SYSTEM

BACKGROUND OF THE INVENTION

The present invention relates to a vehicle steer angle control system for controlling either or both of the front wheel steer angle and the rear wheel steer angle.

Conventional examples of such a steer angle control system are disclosed in U.S. Pat. No. 4,705,131 (corresponding to Japanese Patent Provisional Publication 60-161265), and U.S. Pat. No. 4,666,013 (corresponding to Japanese Patent Provisional Publication 60-161266). The conventional steer angle control systems of these examples are designed to determine front and rear wheel steer angles $\delta_f$ and $\delta_r$ by using the following equations:

$$\delta_f(s) = (af_0 + af_1 s)\theta(s) \quad (1)$$

$$\delta_r(s) = (ar_0 + ar_1 s)\theta(s) \quad (2)$$

where $\delta_f(s)$ and $\delta r(s)$ are the Laplace transforms of the front and wheel steer angles $\delta_f$ and $\delta r$, $\theta(s)$ is the Laplace transform of the steering wheel angle $\theta$, $af_0$, $af_1$, $ar_0$ and $ar_1$ are coefficients whose values are determined by a vehicle speed, and is a Laplace transform variable.

When lags are involved in actuating systems for steering the front and rear wheels, then it is advisable to use the following equations including a term of a second derivative;

$$\delta_f(s) = (af_0 + af_1 s + af_2 s^2)\theta(s) \quad (3)$$

$$\delta_r(s) = (ar_0 + ar_1 s + ar_2 s^2)\theta(s) \quad (4)$$

where $af_2$ and $ar_2$ are coefficients whose values are determined by the vehicle speed.

Therefore, these steer angle control systems need differentiating means for producing an output derivative signal proportional to the derivative of an input signal, such as the steering wheel angle $\theta$, with respect to time. However, the differentiating process employed in the conventional steer angle control systems is not accurate enough for the following reason.

Especially when a digital sensor such as a rotary encoder is employed for sensing the steering wheel angle $\theta$, the derivative signal obtained from the sensed values of the steering wheel angle $\theta$ tends to have periodic sharp changes like pulses whereas the steering wheel angle $\theta$ is changing at a constant speed. Accordingly the derivative must be constant. FIG. 4 shows one example. In this example, the value of the steering wheel angle $\theta$ is read in at time intervals $\Delta t$ equal to 5 msec, and the resolution $\Delta\theta$ of the steering angle sensor is 1 deg. In this case, the resolution of the first derivative $\dot{\theta}$ is given by 1 deg/5 msec = 200 deg/sec, and the resolution of the second derivative $\ddot{\theta}$ is 1 deg/(5 msec)$^2$ = 40000 deg/sec$^2$. As a result, pulses are formed in the first derivative signal and the second derivative signal as shown in FIG. 4. In FIG. 4, the true value of the steering wheel angle $\theta$ is indicated by an inclined straight line alpha while measured values of the steering wheel angle $\theta$ are indicated by small circles distributed along the line alpha. Lines beta and gamma indicate true values of the first derivative $\dot{\theta}$ and the second derivative $\ddot{\theta}$. Small circles along the line beta and the line gamma indicate, respectively, first derivative values and second derivative values obtained from the measured values of the steering wheel angle $\theta$. As shown in FIG. 4, pulses are formed in the first derivative signal $\dot{\theta}$ consisting of a sequence of the first derivative values, and the second derivative signal $\ddot{\theta}$ consisting of a sequence of the second derivative values.

Consequently, the conventional steer angle control systems tend to be inaccurate in determining the front and rear wheel steer angles by solving Equations (1) and (2) or Equations (3) and (4), so that it is difficult to achieve the desired steering steer angle control.

Systems arranged to filter the measured values of the steering wheel angle $\theta$ are also inaccurate because delays due to a filter are introduced in the proportional terms $af_0\theta$ and $ar_0\theta$ which are immune from pulse-like fluctuations.

SUMMARY OF THE INVENTION

It is an object of the present invention to provide an accurate steer angle control system which can accurately perform steer angle control.

According to the present invention, a vehicle steer angle control system comprises, as shown in FIG. 1, (i) initial means 101 for providing a basic signal consisting of a sequence of basic values representing a steering quantity such as the steering wheel angle of a vehicle, (ii) smoothing means 102 for producing a smoothed signal consisting of a sequence of smoothed values each of which is obtained by smoothing a predetermined number of the basic values, (iii) differentiating means 103 for producing a derivative signal representing a predetermined derivative of predetermined order a first, second, or higher derivative) of the steering quantity by using the smoothed values instead of using the basic values, and (iv) final means 104 for producing a steer angle control signal by using the derivative signal and other signals.

DETAILED DESCRIPTION OF THE INVENTION

Figure 1:
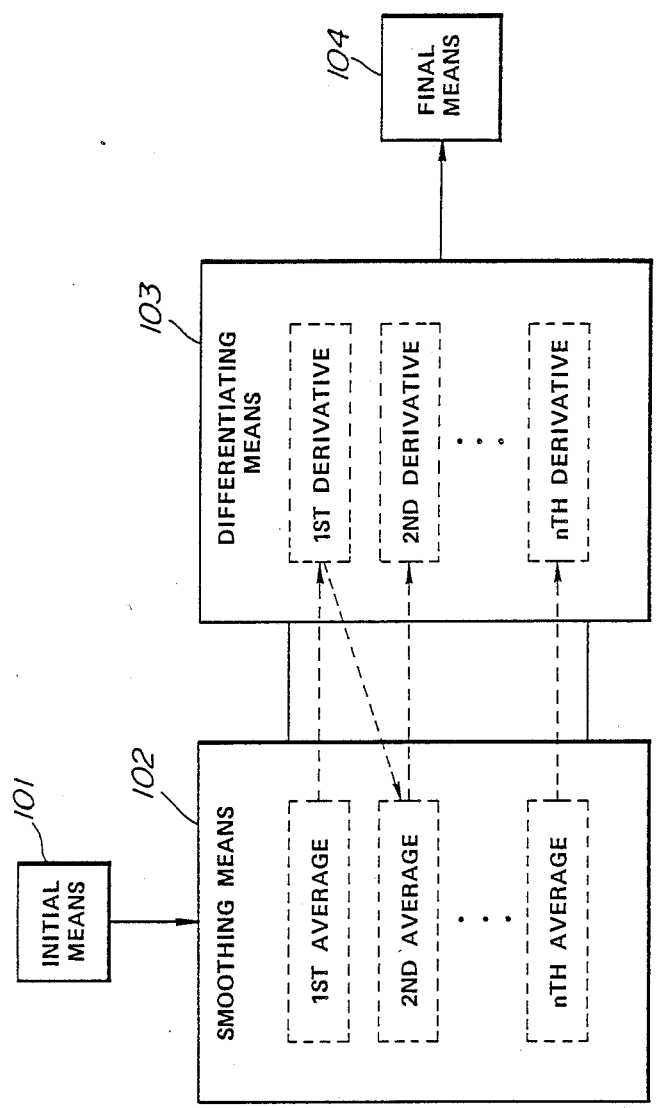
FIG. 1 is a block diagram showing a basic arrangement of a steer angle control system according to the present invention.
Figure 2:
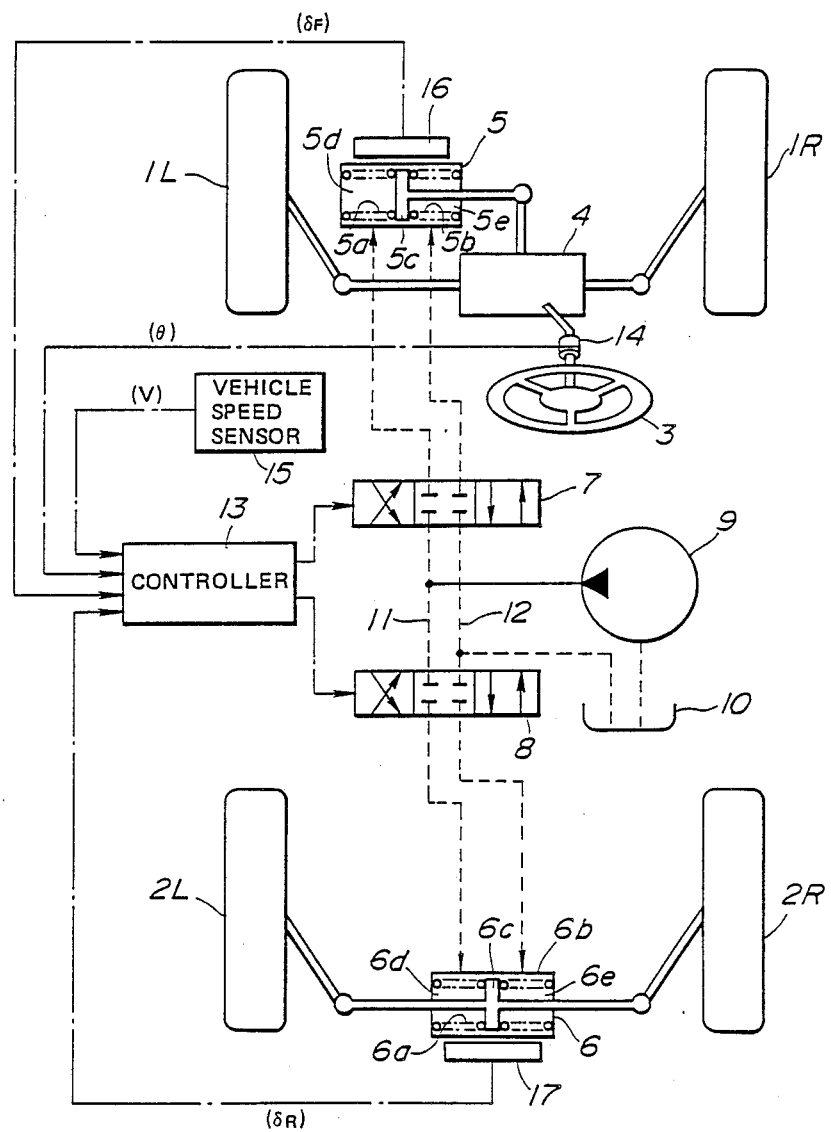
FIG. 2 is a schematic view showing a steer angle control system according to one embodiment of the present invention.
Figure 3:
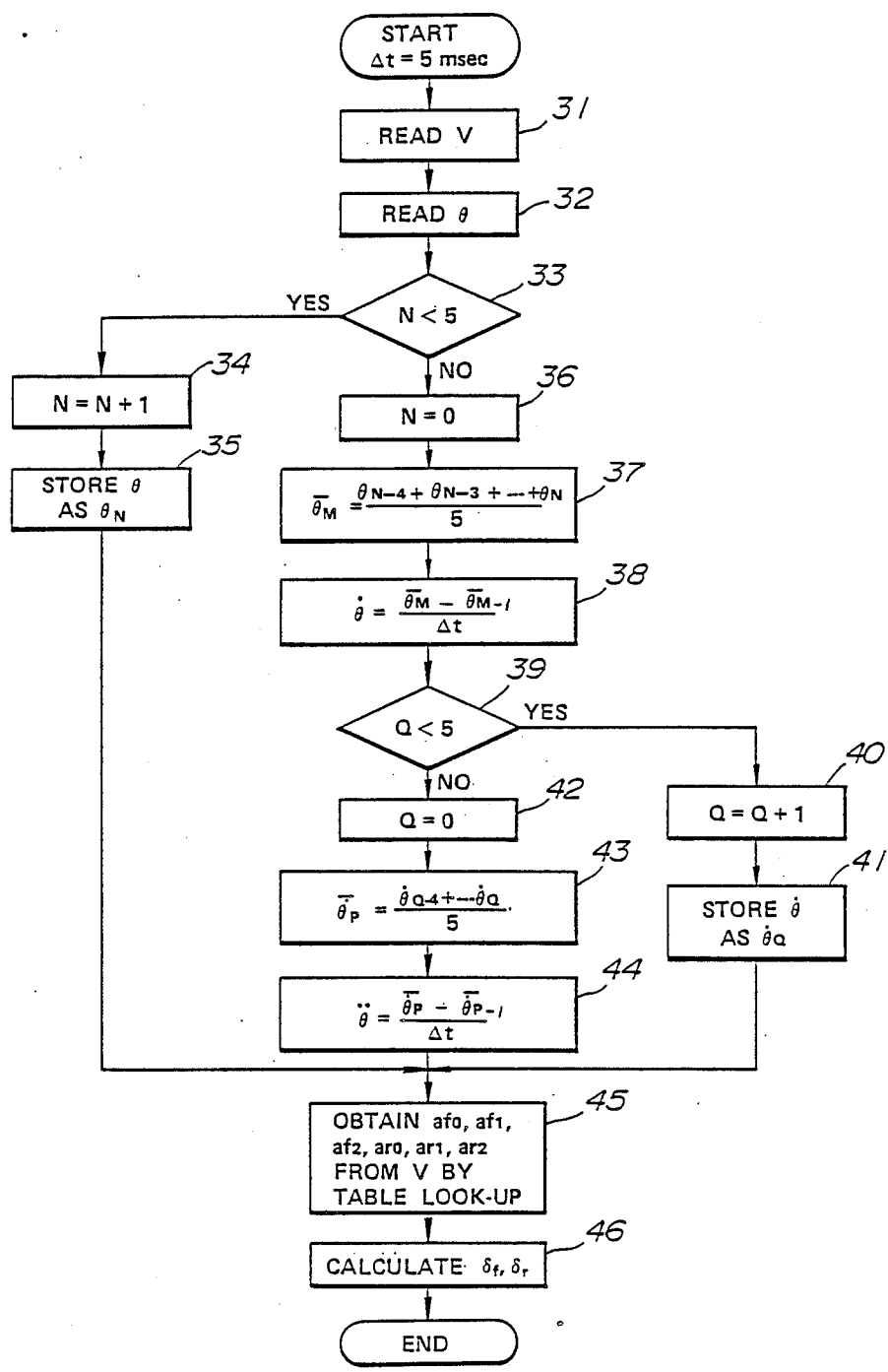
FIG. 3 is a flow chart showing a control process performed by a controller of the system shown in FIG. 2.

One embodiment of the present invention is shown in FIGS. 2 and 3.

A steer angle control system of FIG. 2 is arranged to steer both the front wheels 1L and 1R and the rear wheels 2L and 2R of a vehicle. The front wheels 1L and 1R are connected through a steering gear 4 with a steering wheel 3 so that ordinary steering can be performed. There is further provided a front wheel supplementary steering actuator 5 for performing supplementary steering. In this embodiment, the steering gear 4 is mounted on the vehicle body so that the steering gear 4 is displaceable along the lateral axis of the vehicle. The front actuator 5 is fixedly mounted on the vehicle body, and connected with the steering gear 4. It is optional to employ other known types of the front wheel supplementary steering actuators.

The front actuator 5 of this embodiment has a piston 5c which is resiliently held at a neutral position by a pair of springs 5a and 5b. When the piston 5c is in the neutral position, the steering gear 4 is held in the neutral position in which the front wheels 1L and 1R are steered only by the mechanical steering linkage without the supplementary steering. When fluid pressure is supplied to one of chambers 5d and 5e separated by the piston 5c, the front actuator 5 performs the supplementary steering of the front wheels 1L and 1R by causing the steering gear 4 to displace in a corresponding direction.

The rear wheels 2L and 2R are supported on the vehicle body in a steerable manner, and a rear wheel steering actuator 6 is connected between the left and right rear wheels 2L and 2R. The rear actuator 6 has a piston 6c which is resiliently held at a neutral position by a pair of springs 6a and 6b, and two power chambers 6d and 6e separated by the piston 6c. When the piston 6c is in the neutral position, the rear wheels 2L and 2R are held in the neutral position. When a fluid pressure is supplied to one of the chambers 6d and 6e, the piston 6c moves in one of the left and right directions and steers the rear wheels in the corresponding direction.

A front control valve 7 is connected with the chambers 5d and 5e of the front actuator 5, and a rear control valve 8 is connected with the chambers 6d and 6e of the rear actuator 6. Each of the front and rear control valves 7 and 8 is connected with a pressure source constituted by a pump 9 and a reservoir 10, by a pressure passage 11 and a drain passage 12. In a neutral position shown in FIG. 2, the front control valve 7 locks the front actuators by shutting the chambers 5d and 5e off from the passages 11 and 12, so that the piston 5c becomes unmovable. Similarly, the rear control valve 8 in a neutral position shown in FIG. 2 locks the rear actuator 6 by shutting the chambers 6d and 6e off from the passages 11 and 12, so that the rear wheel steer angle is held constant. Each of the front and rear control valves 7 and 8 also has a first valve position to connect the left chamber 5d or 6d of the front or rear actuator 5 or 6 with the pressure passage 11 and to connect the right chamber 5e or 6e with the drain passage 12, and a second valve position to connect the left chamber 5d or 6d with the drain passage 12 and to connect the right chamber 5e or 6e with the pressure passage 11. In the first valve position, each of the front and rear control valves 7 and 8 causes the front or rear actuator 5 or 6 to steer the front or rear wheels in the leftward direction. The second valve positions of the front and rear control valves 7 and 8 are for rightward steering.

A controller 13 is connected with the front and rear control valves 7 and 8 and is designed to control these valves individually. To obtain input signals, the controller 13 is connected with a steering angle sensor 14 for sensing the steering wheel angle $\theta$ of the steering wheel 3, a vehicle speed sensor 15 for sensing the vehicle speed V, a sensor for sensing a front wheel supplementary steer angle $\delta_F$ by sensing the stroke of the front actuator 5, and a sensor 17 for sensing a rear wheel supplementary steer angle $\delta_R$ by sensing the stroke of the rear actuator 6. The controller 13 determines desired front and rear wheel supplementary steer angles $\delta_f$ and $\delta_r$ by using input data supplied from the steering angle sensor 14 and the vehicle speed sensor 15, and controls the front and rear control valves 7 and 8 individually so that the actual front and rear wheel supplementary steer angles $\delta_F$ and $\delta_R$ sensed by the sensors 16 and 17 become equal to the desired angles $\delta_f$ and $\delta_r$, respectively.

The controller 13 determines the desired front and rear wheel supplementary steer angles according to a computation process shown in FIG. 3. In this example, a set of operations is repeated regularly at intervals $\Delta t$ of 5 msec.

In steps 31 and 32, the controller 13 reads the vehicle speed V and the steering wheel angle $\theta$ every 5 msec. In step 33, the controller 13 determines whether the number N of repetitions of the read step 32 is smaller than a predetermined number which is five in this example. If it is smaller, the controller 13 increments N in step 34, and stores the most recently read value of the steering wheel angle $\theta$ as $\theta_N$ in step 35. When the count N reaches 5, the controller 13 clears the count N to zero in step 36, and calculates a smoothed value $\bar{\theta}_M$ of the steering wheel angle $\theta$ in step 37. In this embodiment, the smoothed value $\bar{\theta}_M$ is an average (or arithmetic mean) of the five values of the steering wheel angle $\theta$ which were most recently read and stored as $\theta_{N-4}, \theta_{N-3}, \ldots \theta_N$. The controller 13 updates the smoothed value each time N becomes equal to 5. In step 38, the controller 13 determines the first order derivative value $\dot{\theta}$ of the steering wheel angle $\theta$ with respect to time by dividing a difference resulting from subtraction from the most recently determined smoothed value $\bar{\theta}_M$ of a previous smoothed value determined in the previous execution of step 37, by the interval $\Delta t$.

In step 39, the controller 13 checks the number Q of repetitions of the first derivative determining step 38. In step 41, it stores the first derivative value $\dot{\theta}$ as $\dot{\theta}_Q$ until Q reaches a predetermined number, which is five in this example. The number Q is increased by one in step 40, and reset to zero in step 42 each time Q reaches 5. Each time the number Q becomes equal to 5, the controller 13 determines a smoothed value $\bar{\dot{\theta}}_P$ of the first derivative at a step 43. In this embodiment, the smoothed value $\bar{\dot{\theta}}_P$ of the first derivative is an average (or arithmetic mean) of the five first derivative values which were most recently determined and stored as $\dot{\theta}_{Q-4}, \ldots \dot{\theta}_Q$. In a step 44, the controller 13 determines the second order derivative value $\ddot{\theta}$ of the steering wheel angle, which is a quotient resulting from division in which the divisor is the interval $\Delta t$, and the dividend is a difference obtained by subtracting the smoothed first derivative value $\bar{\dot{\theta}}_{P-1}$ which was been determined by the previous execution of step 43 from the smoothed first derivative value $\bar{\dot{\theta}}_P$ which was determined by the most recent execution of step 43.

In step 45, the controller 13 determines the values of the coefficients $af_0, af_1, af_2, ar_0, ar_1$ and $ar_2$ corresponding to the vehicle speed V by table lookup or other procedure, and computes the desired front and rear wheel supplementary steer angles $\delta_f$ and $\delta_r$ according to Equations (3) and (4) by using the steering wheel angle value $\theta$, the first derivative $\dot{\theta}$, the second derivative value $\ddot{\theta}$, and the coefficients.

The controller 13 performs feedback control so that the actual front and rear wheel steer angles $\delta_F$ and $\delta_R$ become equal to the desired angles $\delta_f$ and $\delta_r$, respectively.

Figure 4:
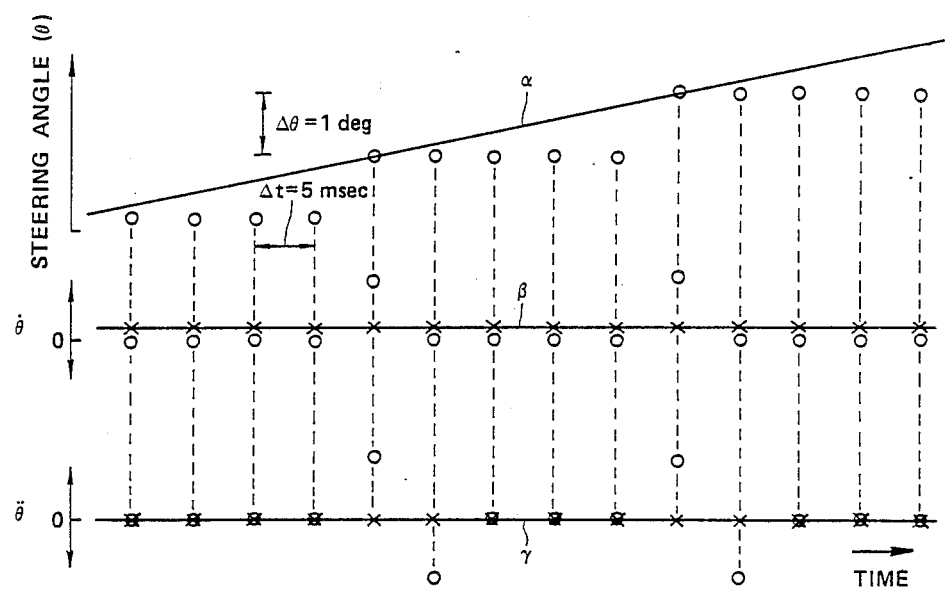
FIG. 4 is a graph showing time series of first and second derivative values computed from read values of the steering angle by the system according to the present invention, together with the results obtained by conventional systems.

In this way, the control system of this embodiment determines the first and second derivative values $\dot{\theta}$ and $\ddot{\theta}$ on the basis of the smoothed values $\bar{\theta}_M$. Therefore, this control system can provide first and second derivative signals which are immune from undesired pulse-like changes, as shown by marks (x) in FIG. 4, so that accurate control can be obtained.

The control system of this embodiment is arranged to smooth not only the steering wheel angle values but also the first derivative values. Therefore, the relative importance of contribution of each measured value of the steering wheel angle $\theta$ to the derivative is decreased as the order of the derivative increases, so that the higher derivatives can be protected from undesired influences.

In this embodiment, the number of measured values of the steering wheel angle used in averaging is increased as the order of differentiation increases. Therefore, the control system can ensure the necessary and sufficient resolution without increasing the delay of output too much.

The control system of the illustrated embodiment is arranged to smooth the measured or derivative values by taking a simple average. However, it is optional to employ the method of moving averages instead of simple averages.

What is claimed is:

1. A vehicle steer angle control system comprising:
   means for providing a basic signal consisting of a sequence of basic values representing a steering quantity of a vehicle;
   smoothing means for producing a smoothed signal consisting of a sequence of smoothed values each of which is obtained by smoothing a predetermined number of said basic values, said smoothing means comprising first averaging means for periodically determining a first average value which is an average of a predetermined first number of said basic values successively supplied from said means for providing a basic signal, and producing a first average signal consisting of a sequence of said first average values;
   differentiating means for producing a derivative signal representing a derivative of said smoothed signal, said differentiating means producing said derivative signal representing said derivative of a predetermined order by differentiating said first average signal, and;
   means for producing a steering angle control signal by using said basic signal and said derivative signal.

2. A steering angle control system according to claim 1 wherein said differentiating means comprises first differential means for periodically determining a first derivative value which is proportional to a fraction whose denominator is equal to a predetermined first time interval, and whose numerator is equal to the difference between two of said first average values which were most recently determined by said first averaging means, and producing a first derivative signal consisting of a sequence of said first derivative values.

3. A steer angle control system according to claim 2 wherein said smoothing means further comprises second averaging means for periodically determining a second average value which is an average of a predetermined second number of said first derivative values successively supplied from said first differentiating means and producing a second average signal consisting of a sequence of said second average values, and said differentiating means further comprises second differential means for periodically determining a second derivative value which is proportional to a fraction whose denominator is equal to a predetermined second interval and whose numerator is equal to the difference between two of said second average values which were most recently determined by said second averaging means and producing a second derivative signal consisting of a sequence of said second derivative values.

4. A steer angle control system according to claim 3 wherein said steering quantity is a steering wheel angle of the vehicle, and said means for providing a basic signal comprises a steering angle sensor for sensing said steering wheel angle.

5. A steer angle control system according to claim 4 wherein said means for providing a basic signal further comprises reading means for periodically reading said steering wheel angle sensed by said steering sensor and producing said basic signal.

6. A steer angle control system according to claim 4 further comprising a vehicle speed sensor for sensing the speed of the vehicle, said final means being connected with said vehicle speed sensor and producing said control signal by using said basic signal, said first and second derivative signals and said vehicle speed sensed by said vehicle speed sensor.

7. A vehicle steer angle control system comprising:
   means for providing a basic signal consisting of a sequence of basic values representing a steering quantity of a vehicle;
   smoothing means for producing a smoothed signal consisting of a sequence of smoothed values each of which is obtained by smoothing a predetermined number of said basic values;
   differentiating means for producing a derivative signal representing a derivative of said smoothed signal, said differentiating means comprising lower order differentiating means for producing a lower order derivative signal consisting of a sequence of lower order derivative values representing a lower order derivative of said steering quantity, and higher order differentiating means for producing a higher order derivative signal representing a higher order derivative of said steering quantity, the order of said higher order derivative being higher than the order of said lower order derivative; and
   means for producing a steer angle control signal by using said basic signal and said derivative signal,
   wherein said smoothing means comprises higher order smoothing means for producing a higher order smoothed signal consisting of a sequence of higher order smoothed values each of which is obtained by smoothing a predetermined number of said lower order derivative values, said higher order differentiating means being connected with said higher order smoothing means and producing said higher order derivative signal by differentiating said higher order smoothed signal.

* * * * *

UNITED STATES PATENT AND TRADEMARK OFFICE
CERTIFICATE OF CORRECTION

PATENT NO. : 4,947,328
DATED : August 7, 1990
INVENTOR(S) : Fukashi Sugasawa

It is certified that error appears in the above-identified patent and that said Letters Patent is hereby corrected as shown below:

ON TITLE PAGE:

In item [54] change "STEERING" to --STEER--.

In item [56] References Cited change "ShibG36ahata" to --Shibahata--;

In item [57] Abstract, Column 2, change "imprive" to --improve--.

Column 5, line 47, change "steering" to --steer--.

Signed and Sealed this

Third Day of December, 1991

Attest:

HARRY F. MANBECK, JR.

*Attesting Officer*     *Commissioner of Patents and Trademarks*